US006852869B2

(12) United States Patent
Sigwart et al.

(10) Patent No.: US 6,852,869 B2
(45) Date of Patent: Feb. 8, 2005

(54) METHOD FOR THE PRODUCTION OF POLYTETRAHYDROFURAN WITH LOW COLOR INDEX

(75) Inventors: Christoph Sigwart, Schriesheim (DE); Anton Meier, Kapellen (BE); Michael Hesse, Worms (DE); Volkmar Menger, Neustadt (DE); Klaus-Peter Pfaff, Friedelsheim (DE); Arthur Höhn, Kirchheim (DE); Lothar Franz, Baton Rouge, LA (US)

(73) Assignee: BASF Aktiengesellschaft, Ludwigshafen (DE)

( * ) Notice: Subject to any disclaimer, the term of this patent is extended or adjusted under 35 U.S.C. 154(b) by 87 days.

(21) Appl. No.: 10/343,982

(22) PCT Filed: Jul. 24, 2001

(86) PCT No.: PCT/EP01/08525

§ 371 (c)(1),
(2), (4) Date: Feb. 6, 2003

(87) PCT Pub. No.: WO02/14405

PCT Pub. Date: Feb. 21, 2002

(65) Prior Publication Data

US 2004/0024172 A1 Feb. 5, 2004

(30) Foreign Application Priority Data

Aug. 16, 2000 (DE) ......................................... 100 40 091

(51) Int. Cl.[7] .......................................... C07D 307/04
(52) U.S. Cl. ..................................................... 549/509
(58) Field of Search .......................................... 549/509

(56) References Cited

U.S. PATENT DOCUMENTS

| 4,480,124 A | 10/1984 | Mueller |
| 4,952,673 A | 8/1990 | Mueller |
| 5,110,779 A | 5/1992 | Hucul |
| 5,516,851 A | 5/1996 | Flick et al. |
| 5,773,648 A | 6/1998 | Becker et al. |
| 6,121,188 A | 9/2000 | Breitscheidel et al. |
| 6,211,401 B1 | 4/2001 | Eller et al. |
| 6,248,924 B1 | 6/2001 | Ruhl et al. |

FOREIGN PATENT DOCUMENTS

| DE | 2 159736 | 6/1973 |
| DE | 44 33 606 | 3/1996 |
| DE | 196 49803 | 7/1998 |
| EP | 061 668 | 10/1982 |
| EP | 302 332 | 2/1989 |
| EP | 814 098 | 12/1997 |
| EP | 842 699 | 5/1998 |
| WO | 94/05719 | 3/1994 |

OTHER PUBLICATIONS

Pure & Appl. Chem., vol. 46, pp. 71–90, 1976.

Primary Examiner—Taofiq Solola
(74) Attorney, Agent, or Firm—Keil & Weinkauf

(57) ABSTRACT

In a process for preparing polytetrahydrofuran, tetrahydrofuran copolymers, diesters or monoesters of these polymers having a low color number, the polymers obtained by cationic polymerization of tetrahydrofuran are hydrogenated in the presence of a macroporous, supported heterogeneous catalyst comprising at least one metal of groups 7 to 10 of the Periodic Table of the Elements as active metal.

12 Claims, No Drawings

METHOD FOR THE PRODUCTION OF POLYTETRAHYDROFURAN WITH LOW COLOR INDEX

The invention relates to a process for preparing polytetrahydrofuran, tetrahydrofuran copolymers, diesters or monoesters of these polymers having a low color number, in which the polymers obtained by cationic polymerization of tetrahydrofuran are hydrogenated in the presence of a macroporous heterogeneous catalyst.

Polytetrahydrofuran ("PTHF"), also referred to as polyoxybutylene glycol, is a versatile intermediate in the plastics and synthetic fibers industry and is employed, inter alia, for preparing polyurethane, polyester and polyamide elastomers. In addition, it like many of its derivatives is a valuable auxiliary in many applications, for example as dispersant or in the deinking of waste paper.

PTHF is advantageously prepared industrially by polymerization of tetrahydrofuran (THF) over suitable catalysts in the presence of reagents whose addition makes it possible to control the chain length of the polymer chains and thus to set the mean molecular weight to the desired value (chain termination reagents or "telogens"). Control is achieved by choice of type and amount of the telogen. Functional groups can be additionally introduced at one end or both ends of the polymer chain by choice of suitable telogens. Thus, for example, the monoesters or diesters of PTHF can be prepared by using carboxylic acids or carboxylic anhydrides as telogens. Other telogens act not only as chain termination reagents but are also incorporated into the growing polymer chain of the PTHF, so that they have the function not only of a telogen but also of a comonomer and can therefore be termed telogen or comonomer with equal justification. Examples of such comonomers are telogens having two hydroxy groups, e.g. dialcohols. Examples of such dialcohols are ethylene glycol, propylene glycol, butylene glycol, 1,4-butanediol, 2-butyne-1,4-diol, 1,6-hexanediol or low molecular weight PTHF. Further suitable comonomers are 1,2-alkylene oxides, for example ethylene oxide or propylene oxide, 2-methyltetrahydrofuran or 3-methyltetrahydrofuran. The use of such comonomers leads to tetrahydrofuran copolymers. In this way, the PTHF can be chemically modified.

As comprehensive studies have shown, acid catalysts are suitable for the polymerization of THF on an industrial scale, but these have the disadvantage of giving polymers having yellow to brownish colors. The discoloration increases with the polymerization temperature. Furthermore, the discoloration is accompanied by an altered reactivity in the preparation of polyesters or polyurethanes from the polytetramethylene ether glycols. These are serious deficiencies, since color and reproducible processing are among the most important properties of a polymer which is to be used industrially.

The purity of the PTHF also depends on the quality of the THF used. For this reason, numerous methods of pretreating technical-grade THF for the purposes of improving the quality have been proposed. Thus, for example, DE-A-2 801 792 describes a process in which THF is treated with bleaching earths prior to the polymerization. Although this gives polymers having an improved color number, this treatment method cannot in every case be applied reproducibly to any available grade of THF.

Processes in which the polymers obtained over acidic heterogeneous catalysts are decolorized in a separate decolorization process after the polymerization has been completed are also known.

According to EP-A 61 668, polytetramethylene ether glycol or diesters thereof having a low color number is/are prepared by subjecting the polymers obtained by cationic polymerization of THF to a treatment with hydrogen in the presence of a hydrogenation catalyst. If the polymerization is carried out using a THF grade as offered on the market, it is necessary to carry out the hydrogenated decolorization at very high hydrogen pressures of, for example, from 50 to 300 bar.

PCT/WO 94/05719 discloses a process for preparing polytetrahydrofuran diesters in which the polymerization of the THF is carried out over acid-activated kaolin, zeolites or amorphous aluminum silicates in the presence of hydrogen and from 1 to 10% by weight of a hydrogenation catalyst.

The hydrogenation catalysts described in PCT/WO 94/05719 and EP-A 61668 have activities and operating lives which fall short of what would be desirable to meet expectations in respect of the purity of the products or to be able to carry out the corresponding processes economically.

It is an object of the present invention to find a process for preparing polytetrahydrofuran, tetrahydrofuran copolymers, diesters and monoesters of these polymers by means of which polymers and copolymers of THF having a low color number can be prepared simply and economically.

We have found that this object is achieved by a process for preparing polytetrahydrofuran tetrahydrofuran copolymers, diesters or monoesters of these polymers having a low color number, wherein the polymers obtained by cationic polymerization of tetrahydrofuran are hydrogenated in the presence of macroporous, supported heterogeneous catalyst comprising at least one metal of groups 7 to 10 of the Perodic Table of the Elements as active metal.

The novel process makes it possible to prepare highly pure polytetrahydrofuran, highly pure tetrahydrofuran copolymers and highly pure diesters or monoesters of these polymers having a low color number reliably and reproducibly. Owing to the high activity and operating life of the macroporous catalysts used, the hydrogenation can be carried out under gentle conditions using short residence times.

The process of the present invention can be applied to all polymers which are obtained by cationic polymerization of tetrahydrofuran. Polytetrahydrofuran, tetrahydrofuran copolymers, diesters or monoesters of these polymers can be obtained by methods known per se, as described, for example, in DE 44 33 606 and DE 19649803.

The crude polymerization products of the cationic polymerization of tetrahydrofuran, which comprise, inter alia, unreacted tetrahydrofuran, telogen and/or comonomer, can in principle be used directly for the process of the present invention. However, it is also possible to use prepurified polymers, i.e. polymers from which, for example, unreacted tetrahydrofuran or low molecular weight polymerization products have been separated off by distillation or other suitable methods.

According to the present invention, the polymers are hydrogenated in the presence of a macroporous heterogenous catalyst comprising at least one metal of groups 7 to 10 of the periodic Table of the Elements as active metal, applied to a support. The primarily yellowish brown color of the polymers disappears and colorless products are obtained.

The novel process makes it possible to prepare THF polymers and copolymers having low color numbers of not more than about 20 APHA, preferably not more than about 15 APHA, even from low-quality THF grades. The determination of the color numbers is described in the standard DIN 6271.

The macroporous heterogeneous catalyst can in principle comprise any metals of groups 7 to 10 of the periodic Table of the Elements as active metal. The active metal used is preferably palladium, ruthenium, rhenium, nickel, iron or cobalt or a mixture of two or more of these active metals. Particular preference is given to using palladium as active metal.

For the purposes of the present invention, the term "macroporous" is used as it is defined in Pure Appl. Chem., 46, p. 79 (1976), namely as having pores whose diameter is above 50 nm. The proportion of macropores having a pore diameter of more than 100 nm, based on the total pores, in the heterogeneous catalyst used according to the present invention, i.e. the macroporosity of the heterogeneous catalyst, is more than 10% by volume, preferably more than 20% by volume, particularly preferably from 25 to 90% by volume, in each case based on the total pores.

The active metal content is generally from 0.01 to 10% by weight, preferably from 0.05 to 5% by weight and in particular from 0.1 to 3% by weight, based on the total weight of the catalyst.

The total metal surface area on the macroporous supported catalyst used according to the present invention is preferably from 0.01 to 10 $m^2/g$, more preferably from about 0.05 to 5 $m^2/g$, in particular from about 0.05 to 3 $m^2/g$, of the catalyst. The metal surface area is determined by means of the chemisorption method described by J. LeMaitre et al. in "Characterization of Heterogeneous Catalysts", Editor: Francis Delanney, D, New York 1984, p. 310–324.

The macroporous heterogeneous catalysts used according to the present invention can be produced industrially by various methods known per se, for example by application of at least one metal of groups 7 to 10 of the Periodic Table of the Elements to a suitable macroporous support.

The application to the support can be achieved by impregnation of the support with aqueous metal salt solutions, e.g. aqueous palladium salt solutions, by spraying appropriate metal salt solutions onto the support or by other suitable methods. Suitable salts of metals of groups 7 to 10 of the Periodic Table of the Elements are nitrates, nitrosyl nitrates, halides, carbonates, carboxylates, acetylacetonates, chloro complexes, nitro complexes or amine complexes of the corresponding metals, with preference being given to nitrates and nitrosyl nitrates. In the case of catalysts comprising a plurality of metals of groups 7 to 10 of the Periodic Table, the metal salts or their solutions can be applied simultaneously or in succession.

The supports which have been coated or impregnated with metal salt solutions are subsequently dried, preferably at from 100° C. to 150° C., and, if desired, calcined at from 200° C. to 600° C., preferably from 350° C. to 450° C. In the case of separate impregnation, the catalyst is dried and if desired calcined, as described above, after each impregnation step. The order in which the active components are applied can be chosen freely.

The coated and dried and possibly calcined supports are subsequently activated by treatment in a gas stream comprising free hydrogen at from 30° C. to 600° C., preferably from 150° C. to 450° C. The gas stream preferably consists of from 50 to 100% by volume of $H_2$ and from 0 to 50% by volume of $N_2$.

Support materials which can be used for producing the catalysts used according to the present invention are macroporous and have a mean pore diameter of at least 50 nm, preferably at least 100 nm, in particular 500 nm, and have a BET surface area of not more than about 300 $m^2/g$, preferably about 15 $m^2/g$, more preferably about 10 $m^2/g$, in particular about 5 $m^2/g$ and most preferably not more than 3 $m^2/g$.

The surface area of the support is determined by the BET method using $N_2$ adsorption, in particular in accordance with DIN 66131. The pore diameter and pore distribution are determined by Hg porosimetry, in particular in accordance with DIN 66133.

Although all support materials known in catalyst production and having the above-defined macroporosity can be used in principle, preference is given to using activated carbon, silicon carbide, silicon oxide, mullite, cordierite, aluminum oxide, titanium oxide, zirconium oxide, magnesium oxide, zinc oxide or mixtures thereof, more preferably aluminum oxide and zirconium dioxide and mullite, particularly preferably aluminum oxide.

Furthermore, the macroporous heterogeneous catalysts used according to the present invention can be produced industrially by the process known from EP-A-653 243, in which the active metal and macropores are introduced in one step. In the process known from EP-A-653 243, the macroporous heterogeneous catalysts used according to the present invention are produced by dissolving a water-soluble salt of a metal of groups 7 to 10 of the Periodic Table of the Elements in an organic solvent, admixing the solution obtained in this way with an organic polymer which is able to bind at least ten times its own weight of water, subsequently mixing the polymer with a catalyst support material and shaping the mass obtained in this way, followed by drying and calcination.

Preferred water-soluble salts of metals of groups 7 to 10 of the Periodic Table of the Elements are nitrates, nitrosyl nitrates, halides, carbonate, carboxylates, acetylacetonates, chloro complexes, nitro complexes and amine complexes of the corresponding metals, with particular preference being given to nitrates and nitrosyl nitrates. Preferred solvents are water-miscible solvents such as alcohols, ethers and amines. Alcohols which may be mentioned are, in particular, $C_1$–$C_4$-alcohols such as methanol, ethanol, isopropanol and n-butanol; a possible ether is, for example tetrahydrofuran. Examples of suitable amines are ammonia, monoamines such as diethylamine, methylamine, triethylamine, ethylamine, propylamine and butylamine.

As organic polymer, preference is given to using crosslinked polymers of acrylic acid, acrylic acid and acrylamide and also of acrylamide, with particular preference being given to partially neutralized sodium polyacrylates which are slightly crosslinked. Possible chemical crosslinkers are, for example, diols such as ethylene glycol, polyethylene glycol and polyols, diamines and dienes in amounts of from 0.1 to 5% by weight, based on the polymer.

Preferred support materials are activated carbon, silicon carbide, aluminum oxide, titanium oxide, mullite, cordierite, zirconium oxide, magnesium oxide, zinc oxide and mixtures thereof, more preferably aluminum oxide and zirconium dioxide and mullite, particularly preferably aluminum oxide.

Further details regarding production of the macroporous catalysts used according to the present invention with introduction of active metal and macropores in one step may be found in EP-A-653 243, whose relevant contents are hereby fully incorporated by reference into the present application.

Furthermore, the macroporous catalysts used according to the present invention can be produced industrially using pore formers by the process known from EP-A 842 699. Pore formers which can be used here are all water-miscible polymers which have a molar mass of from more than about 6000 to 500,000 g/mol. Their molar mass is preferably from about 10,000 to about 200,000 g/mol, more preferably from about 13,000 to about 150,000 g/mol and in particular from about 13,000 to about 50,000 g/mol. Examples of polymers which can be used include polyvinyl chloride, copolymers of an olefin with polar comonomers, e.g. ethylene or propylene with vinyl chloride, polyvinylidene chloride copolymers, ABS resins, polyethylene copolymers with vinyl acetate, alkyl acrylates, acrylic acid, chlorinated polyethylenes, chlorosulfonated polyethylenes, thermoplastic polyurethanes, polyamides such as nylon-5, nylon-12, nylon-6.6, nylon-6.10, nylon-11, fluorine-containing resins such as polyvinylidene fluoride, polychlorotrifluoroethylene, acrylonitrile-(meth)acrylate copolymers, e.g. methacrylonitrile-styrene copolymers, polyalkyl (meth)acrylates, cellulose acetate, cellulose acetate butyrate, polycarbonates, polysulfones, polyphenyl oxide, polyesters such as polybutylene terephthalate, and polyvinyl alcohol, with particular preference being given to polyvinyl alcohol.

To produce the macroporous catalysts used according to the present invention, an aluminum alloy is firstly prepared in a known manner from aluminum and the active metal of groups 7 to 10 of the Periodic Table of the Elements by the process known from DE 2 159 736.

According to EP-A-0 842 699, a kneadable composition is then produced from this alloy, a shaping aid, water and the pore former, this kneadable composition is then shaped to form shaped bodies, the shaped bodies are calcined and the calcined shaped bodies are finally treated with an alkali metal hydroxide.

Further details of this industrial method of producing the macroporous catalysts used according to the present invention may be found in EP-A-842 699, whose relevant contents are hereby fully incorporated by reference into the present application.

The macroporous catalysts used according to the present invention are preferably produced by application of at least one metal of groups 7 to 10 of the Periodic Table of the Elements to a suitable macroporous support.

If desired, the macroporous catalysts used according to the present invention can additionally be doped with bases in order to avoid redissociation of the polymer during the hydrogenation, especially at high hydrogenation temperatures. Examples of suitable bases are basic oxides such as alkali metal oxides or alkaline earth metal oxides, for example sodium oxides, potassium oxides, calcium oxides, barium oxides. Particular preference is given to sodium oxides. These oxides or their precursors, e.g. the respective hydroxides, carbonates or hydroxy carbonates, can be applied to the catalyst in concentrations of from 0.05–5%, based on the weight of the catalyst, for example by impregnation in supernatant solution, spray impregnation or during the agglomeration of the support. This is followed, if appropriate, by heat treatment to decompose the precursor thermally.

The macroporous catalysts used according to the present invention can be prereduced by means of hydrogen before use in the hydrogenation.

The macroporous catalysts which can be employed according to the present invention may be used in the process of the present invention in the form of powder, for example when the process is carried out in the suspension mode, or advantageously as shaped bodies, e.g. in the form of extrudates, cylinders, spheres, rings or granules, particularly when the catalyst is arranged in a fixed bed.

The hydrogenation carried out according to the present invention can be operated batchwise or continuously; for economic reasons, continuous operation is generally preferred. In this case, the hydrogenation can be carried out in conventional reactors or reactor assemblies suitable for continuous processes in the suspension or fixed-bed mode, for example in loop reactors or stirred reactors in the case of a suspension process or in tube reactors or fixed-bed reactors in the case of a fixed-bed process. A fixed-bed process is preferred.

The hydrogenation employed according to the present invention is carried out at hydrogen pressures of from 1 to 200 bar, preferably from 1 to 50 bar, particularly preferably from 5 to 25 bar, and at from 20 to 200° C., preferably from 50 to 150° C., particularly preferably from 70 to 140° C.

The residence time depends on the desired color number result and is usually not more than about 20 hours, preferably 15 hours, particularly preferably not more than about 10 hours.

In continuous operation, the WHSV over the catalyst is usually from 0.05 to 2.0 kg of polymer/(1 of catalyst * h), preferably from 0.1 to 1.0 kg of polymer/(1 of catalyst * h), particularly preferably from 0.1 to 0.5 kg of polymer/(1 of catalyst * h). As hydrogenation gases, it is possible to use any gases which comprise free hydrogen and contain no harmful amounts of catalyst poisons, for example carbon monoxide. Preference is given to using pure hydrogen as hydrogenation gas.

The hydrogenation employed according to the present invention can be carried out in the presence or absence of a solvent or diluent. As solvent or diluent, it is possible to use any suitable solvent or diluent which forms a homogeneous solution with the polymer to be hydrogenated and is largely inert under the reaction conditions, for example ethers such as tetrahydrofuran, dioxane or aliphatic alcohols in which the alkyl radical preferably has a length of from 1 to 10 carbon atoms, e.g. methanol, ethanol and propanol. Preference is given to using tetrahydrofuran and/or methanol.

The amount of solvent or diluent used is not restricted in any particular way and can be chosen freely as required, but preference is given to amounts which lead to a 10–90% strength by weight solution, preferably a 20–50% strength by weight solution, of the polymer to be hydrogenated.

EXAMPLES

Catalyst Production Example A 72.7 g of a palladium nitrate solution (11% by weight of palladium) were admixed with 4000 ml of water and 100 g of a high molecular weight sodium polyacrylate (Aqualic®, from BASF AG). After 60 minutes, the gel-like mass obtained was kneaded with 5527 g of pseudoboehmite in a Mix-Muller for 70 minutes. During this time, 200 g of a 25% strength aqueous ammonia solution and 900 ml of water were added. The composition was shaped in an extruder to give 4 mm extrudates which were subsequently dried at 120° C. and then heated at 500° C. for one hour. Catalyst A contained 0.21% by weight of palladium and had a macropore content of about 38%. The BET surface area was 235 $m^2/g$.

Catalyst Production Example B 47 g of an aqueous palladium nitrate solution (11% by weight of palladium) were diluted with 680 ml of water and sprayed onto 2253 g of a macroporous aluminum oxide support in extrudate form (4 mm extrudates, alpha-$Al_2O_3$, BET surface area: 8 $m^2/g$). Drying and heat treatment were carried out as described for catalyst A. Catalyst B contained 0.22% by weight of palladium and had a macropore content of about 36%.

Catalyst Production Example C 13.8 g of an aqueous palladium nitrate solution (11% by weight of palladium) were diluted with 420 ml of water and sprayed onto 730 g of a macroporous aluminum oxide support in the form of spheres (2–4 mm spheres, gamma-$Al_2O_3$, BET surface area: 230 $m^2/g$). Drying and heat treatment were carried out as described for catalyst A. Catalyst C contained 0.21% by weight of palladium and had a macropore content of about 32%.

Catalyst Production Example D 19.8 g of an aqueous palladium nitrate solution (11% by weight of palladium) were diluted with 1000 ml of water and sprayed onto 1042 g of a macroporous aluminum oxide support in extrudate form (1.5 mm extrudates, gamma/theta-$Al_2O_3$, BET surface area: 85 $m^2/g$). Drying and heat treatment were carried out as described for catalyst A. Catalyst D contained 0.22% by weight of palladium and had a macropore content of about 33%.

Catalyst Production Example E 59.3 g of an aqueous palladium nitrate solution (12.6% by weight of palladium) were diluted with 940 ml of water and sprayed onto 2993 g of a macroporous aluminum oxide support in extrudate form (4 mm extrudates, alpha-$Al_2O_3$, BET surface area 6.4 $m^2/g$). Drying and heat treatment were carried out as described for catalyst A. Catalyst E contained 0.24% by weight of palladium and had a macropore content of about 70%.

Catalyst Production Example F 59.3 g of an aqueous palladium nitrate solution (12.6% by weight of palladium) were diluted with 1020 ml of water and sprayed onto 2993 g of a macroporous aluminum oxide support in extrudate form (4 mm extrudates, alpha-$Al_2O_3$, BET surface area 8.9 $m^2/g$). Drying was carried out as described for catalyst A, after which the impregnated support was heat treated at 650° C. for 2 hours. Catalyst F contained 0.24% by weight of palladium and had a macropore content of about 49%.

Comparative Catalyst Production Example G 3255 g of an aqueous palladium nitrate solution (11% by weight of palladium) were diluted with 79 l of water and sprayed onto 140 kg of an aluminum oxide support in the form of spheres (1.5 mm extrudates, gamma-$Al_2O_3$, BET surface area: 230 $m^2/g$). Drying was carried out at 120° C., followed by heat treatment at 300° C. for 6 hours. Catalyst G contained 0.72% by weight of palladium and had a proportion of macropores of less than 10%.

Comparative Catalyst Production Example H

Silicon dioxide in extrudate form (4 mm, BET surface area: 140 $m^2/g$) was impregnated twice for 15 minutes with a supernatant solution of nickel nitrate, copper nitrate and manganese nitrate and phosphoric acid (9.2% by weight of Ni, 3.2% by weight of Cu, 0.8% by weight of Mn and 0.65% by weight of phosphoric acid). After each impregnation, the extrudates were dried at 120° C. and heat treated at 630° C. Catalyst H contained 21% by weight of NiO, 7.3% by weight of CuO, 2% by weight of $Mn_3O_4$ and 1.2% by weight of $H_3PO_4$ and had a proportion of macropores of less than 10%.

Example 1

Preparation of PTHF Diacetate

To prepare PTHF diacetate, a mixture of tetrahydrofuran (6.0 kg) and acetic anhydride (320 g) was circulated by pumping under protective gas at 50° C./atmospheric pressure over a dried montmorillonite catalyst (2 kg of sheet silicate catalyst K 306 from Süd-Chemie) in the form of 5 mm spheres arranged as a fixed bed in a 3 l reactor for 16 hours. Unreacted tetrahydrofuran was distilled off from the reaction mixture to give 2.97 kg of PTHF diacetate having a molecular weight $M_n$=970 and a color number of 60 APHA.

Examples 2–7

Comparative Examples 1–2

In each experiment, 15 g of catalyst A, B, C or D or comparative catalyst E or F were placed in a 300 ml stirring autoclave and 150 g of the polytetrahydrofuran diacetate prepared as described in Example 1 were added. The hydrogenation was carried out using pure hydrogen at a constant pressure of 10 bar and a temperature of 120° C. The color number of the PTHF diacetate was determined after a reaction time of 5, 10 and 20 hours. The results are shown in the Table.

TABLE

| Ex. | Cat. | Proportion of macropores (% by volume) | Noble metal content | Color number (APHA) after a reaction time of 5 h | 10 h | 20 h |
|---|---|---|---|---|---|---|
| 2 | A | 38 | 0.21% Pd | 5 | 2 | 1 |
| 3 | B | 36 | 0.22% Pd | 7 | 1 | 0 |
| 4 | C | 32 | 0.21% Pd | 6 | 2 | 0 |
| 5 | D | 33 | 0.22% Pd | 6 | 2 | 1 |
| 6 | E | 70 | 0.24 | n.d. | n.d. | 3 |
| 7 | F | 49 | 0.24 | n.d. | n.d. | 4 |
| Comp. 1 | G | <10 | 0.72% Pd | 25 | 15 | 8 |
| Comp. 2 | H | <10 | 21% Ni | 24 | 14 | 11 | n.d. = not determined

Comparison of the examples according to the present invention using catalysts A to F with the comparative examples using catalysts G and H which are not according to the invention shows that the process of the present invention using hydrogen gives polytetrahydrofuran diesters having a significantly lower color number after a shorter reaction time. Owing to the significantly shorter reaction times, smaller reactors are required for the process of the present invention, which results in a considerable economic advantage.

We claim:

1. A process for preparing polytetrahydrofuran, tetrahydrofuran copolymers, diesters or monoesters of these polymers having a low color number, wherein the polymers obtained by cationic polymerization of tetrahydrofuran are hydogenated in the presence of a macroporous, supported heterogeneous catalyst comprising at least one metal of groups 7 to 10 of the Periodic Table of the Elements as active metal.

2. A process as claimed in claim 1, wherein the polymerization is carried out at from 20 to 200° C. and hydrogen pressures of from 1 to 200 bar.

3. A process as claimed in claim 1, wherein the macroporous heterogeneous catalyst comprises as active metal palladium, ruthenium, rhenium, nickel, iron or cobalt or a mixture of two or more of these active metals.

4. A process as claimed in claim 3, wherein the heterogeneous catalyst has macroporosity of above 10% by volume.

5. A process as claimed in claim 3, wherein the heterogeneous catalyst comprises aluminum oxide and/or zirconium dioxide as support material.

6. A process as claimed in claim 1, wherein the heterogeneous catalyst has a metal surface area of from 0.01 to 10 m²/g.

7. A process as claimed in claim 1, wherein the heterogeneous catalyst has a BET surface area of from 0.1 to 300 m²/g.

8. A process as claimed in claim 1, wherein the heterogeneous catalyst has an active metal content of from 0.01 to 10% by weight.

9. A process as claimed in claim 1, wherein the heterogeneous catalyst comprises pores having a diameter of above 50 nm.

10. A process as claimed in claim 1, wherein the heterogeneous catalyst has a macroporosity of more than 10% by volume.

11. A process as claimed in claim 1, wherein the heterogeneous catalyst has a macroporosity of more than 20% by volume.

12. A process as claimed in claim 1, wherein the heterogeneous catalyst has a macroporosity of from 25 to 90% by volume.

* * * * *